US010544794B2

(12) United States Patent
Aihara et al.

(10) Patent No.: US 10,544,794 B2
(45) Date of Patent: Jan. 28, 2020

(54) SEALING STRUCTURE FOR CASING

(71) Applicant: NOK Corporation, Tokyo (JP)

(72) Inventors: Kazuya Aihara, Fukushima (JP);
Shinya Nakaoka, Shizuoka (JP); Isao
Tanji, Fukushima (JP)

(73) Assignee: NOK CORPORATION (JP)

( * ) Notice: Subject to any disclaimer, the term of this
patent is extended or adjusted under 35
U.S.C. 154(b) by 0 days.

(21) Appl. No.: 15/522,688

(22) PCT Filed: Oct. 15, 2015

(86) PCT No.: PCT/JP2015/079158
§ 371 (c)(1),
(2) Date: Apr. 27, 2017

(87) PCT Pub. No.: WO2016/076063
PCT Pub. Date: May 19, 2016

(65) Prior Publication Data
US 2017/0314564 A1 Nov. 2, 2017

(30) Foreign Application Priority Data

Nov. 13, 2014 (JP) .................................. 2014-231082

(51) Int. Cl.
F04D 29/08 (2006.01)
F04D 29/42 (2006.01)
(Continued)

(52) U.S. Cl.
CPC ......... F04D 29/086 (2013.01); F04D 29/426
(2013.01); F16J 15/0825 (2013.01); F01P
5/10 (2013.01); F16J 2015/0856 (2013.01)

(58) Field of Classification Search
CPC .... F16J 15/0806; F16J 15/122; F16J 15/0887;
F16J 15/0825; F16H 61/0009; H05K
9/0015; F04D 29/086; F04D 29/08
See application file for complete search history.

(56) References Cited

U.S. PATENT DOCUMENTS 1,851,948 A * 3/1932 Summers ............... F16J 15/122
277/606
2,700,340 A 1/1955 Wood
(Continued)

FOREIGN PATENT DOCUMENTS

CN 1396379 A 2/2003
CN 202370644 U 8/2012
(Continued)

OTHER PUBLICATIONS

Chinese Office Action for Patent Application No. CN 201580061867.0
dated Nov. 16, 2017.
(Continued)

Primary Examiner — Eugene G Byrd
(74) Attorney, Agent, or Firm — Harness, Dickey &
Pierce, P.L.C.

(57) ABSTRACT

The present invention has an object of providing a sealing structure for a casing that suppresses the deformation of a center plate of a laminated gasket on a partition wall and ensures the compression amount of a bead on the partition wall, without the center plate being thickened. The object is achieved by a sealing structure including: a case 2, the interior of which is partitioned by a partition wall 25 into an upstream chamber 23 and a downstream chamber 24; a cover 3, which forms a flow path for a fluid that causes the upstream chamber 23 and the downstream chamber 24 to be communicated inside; and a laminated gasket 4, in which a first gasket 41, a center plate 43, and a second gasket 42 are laminated, and that is provided between a butting surface 22a of the case 2 and a butting surface 32a of the cover 3, in which the first gasket 41 and the second gasket 42 respectively include beads 41b and 42b along the butting surfaces 22a and 32a, and the first gasket 41 and the center plate 43 respectively include partition-wall sealing portions 41a and 43a along the partition wall 25, the partition-wall (Continued)

sealing portion 41a of the first gasket 41 includes the beads 41b, and the cover 3 is provided with a contact portion 34 that applies a contact force to the partition-wall sealing portion 43a of the center plate 43.

2 Claims, 7 Drawing Sheets

(51) Int. Cl.
*F16J 15/08* (2006.01)
*F01P 5/10* (2006.01)

(56) References Cited

U.S. PATENT DOCUMENTS

| | | | |
|---|---|---|---|
| 4,290,616 A * | 9/1981 | Nicholson | F16J 15/0825 277/592 |
| 4,471,968 A * | 9/1984 | Schlaupitz | F16J 15/122 277/592 |
| 4,544,332 A | 10/1985 | Shibuya | |
| 4,728,110 A * | 3/1988 | Nakasone | F16J 15/0825 277/595 |
| 4,799,695 A * | 1/1989 | Yoshino | F16J 15/0806 277/591 |
| 4,810,591 A * | 3/1989 | Sakai | C09K 3/10 277/592 |
| 5,269,541 A * | 12/1993 | Inamura | F02F 11/002 277/595 |
| 5,280,929 A * | 1/1994 | Miyaoh | F16J 15/0831 277/595 |
| 5,344,165 A * | 9/1994 | Miyaoh | F16J 15/0825 277/595 |
| 5,476,367 A | 12/1995 | Zimmermann et al. | |
| 5,551,709 A * | 9/1996 | Plunkett | F16J 15/0825 277/592 |
| 5,570,501 A * | 11/1996 | Atkinson | F16J 15/122 156/219 |
| 6,189,895 B1 * | 2/2001 | Yamada | F02F 11/00 277/591 |
| 6,247,704 B1 * | 6/2001 | Battistoni | F16J 15/122 277/592 |
| 6,349,945 B1 * | 2/2002 | Schmucker | F16J 15/0818 277/592 |
| 6,457,724 B2 * | 10/2002 | Ogaeri | F16J 15/0825 277/591 |
| 6,736,405 B2 * | 5/2004 | Hilgert | F16J 15/0825 277/591 |
| 8,695,986 B2 * | 4/2014 | Clemons | F16J 15/0825 277/592 |
| 2003/0011140 A1 | 1/2003 | Murakami et al. | |
| 2008/0217866 A1 * | 9/2008 | Tripathy | F16J 15/0818 277/595 |
| 2010/0025940 A1 * | 2/2010 | Uchida | F16J 15/0825 277/593 |
| 2010/0225071 A1 * | 9/2010 | Mori | F02F 11/00 277/592 |
| 2011/0024991 A1 * | 2/2011 | Capellmann | F16J 15/0806 277/592 |
| 2011/0095488 A1 * | 4/2011 | Plunkett | F16J 15/0825 277/592 |
| 2012/0225299 A1 * | 9/2012 | Takahashi | B05D 5/083 428/421 |

FOREIGN PATENT DOCUMENTS

| | | | | |
|---|---|---|---|---|
| EP | 0094616 A1 * | 11/1983 | | F16J 15/0806 |
| JP | 7158589 | 6/1995 | | |
| JP | 2001-107884 A | 4/2001 | | |
| JP | 2005-030248 A | 2/2005 | | |
| JP | 2006-105085 A | 4/2006 | | |

OTHER PUBLICATIONS

Extended European Search Report for Patent Application No. EP 15859519.9 dated Jun. 12, 2018.
International Search Report for Patent Application No. PCT/JP2015/079158 dated Jan. 12, 2016.
International Preliminary Report on Patentability and Written Opinion for Patent Application No. PCT/JP2015/079158 dated Jan. 12, 2016.

* cited by examiner (a) Fig. 8
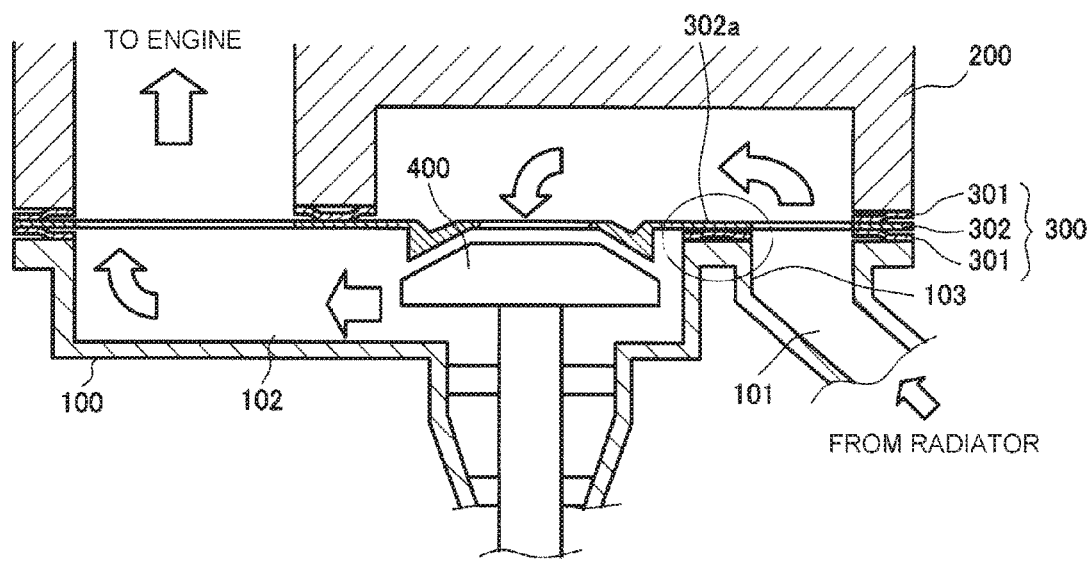
(b)
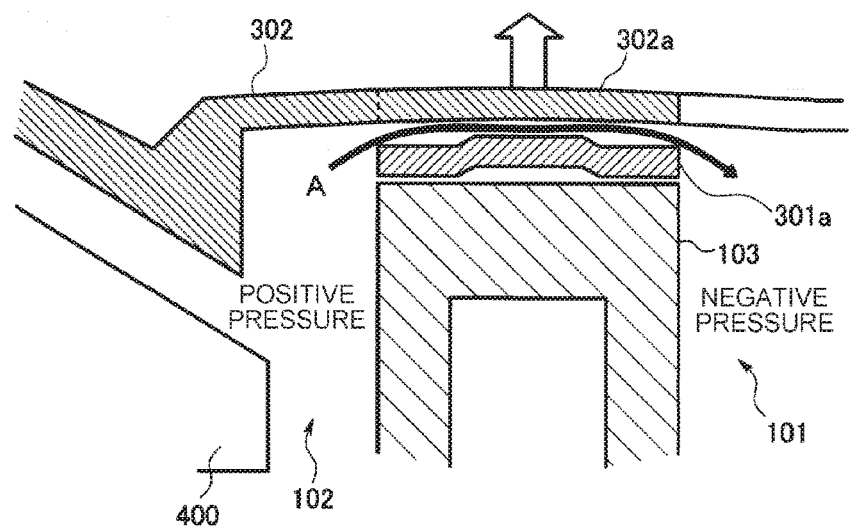

SEALING STRUCTURE FOR CASING

FIELD OF THE INVENTIONS

The present invention relates to a sealing structure for a casing, and more particularly, to a sealing structure for a casing having a partition wall inside for sealing such a casing with a laminated gasket.

BACKGROUND OF THE INVENTIONS

Generally, a water pump circulates coolant of a water-cooled engine such as an engine for an automobile. Such a water pump has a casing (which is also referred to a body). The casing is formed by butting a case against a cover, and an impeller is disposed in the interior space of the casing. The water pump rotates the impeller, to draw a coolant from a radiator into the casing and cause the coolant to flow out to an engine outside the casing (Patent Document 1).

As shown in FIGS. 6 and 7, there is a casing that has a partition wall 103 inside a case 100. The partition wall 103 partitions the case 100 into an upstream chamber 101, which is coupled to a radiator, and a downstream chamber 102, in which an impeller is disposed. The partition wall 103 is formed so as to have an approximately same height as that of the tip of impeller 400, so that a coolant radially emitted by the rotation of the impeller 400 does not disturb the flow of a coolant drawn from the side of the upstream chamber 101. The components of the water pump are omitted in FIG. 6.

Attaching the cover 200 in such a manner as to block the upper opening of the case 100 causes the upstream chamber 101 and the downstream chamber 102 on the side of the case 100 to be communicated inside the cover 200, causes the coolant drawn into the upstream chamber 101 in the casing by the rotation of the impeller to flow through the interior of the cover 200 across the partition wall 103 into the downstream chamber 102, and causes the coolant to flow out from the downstream chamber 102 outside the casing.

A laminated gasket 300 is used to seal between the case 100 and the cover 200 water-tightly. In the laminated gasket 300, two gaskets 301 and 301 each having beads and a center plate 302 made of a metal sheet interposed between the gaskets 301 and 301 are laminated. The fastening of the case 100 and the cover 200 with bolts (not shown) compresses the beads, and the reaction forces of the beads at this time seal the laminated gasket 300 between the case 100 and the cover 200.

PRIOR ART DOCUMENTS

Patent Documents

Patent Document 1: JP-A-1995-158589

SUMMARY

In the laminated gasket 300 described above, partition-wall sealing portions 301a and 302a along the partition wall 103 are respectively formed in the gasket 301 and the center plate 302. The gasket 301 and the center plate 302 are disposed on the side of the case 100. Although not illustrated in FIG. 6, a bead is also formed in the partition-wall sealing portion 301a of the gasket 301.

However, in the above casing, the part on the side of the cover 200 corresponding to the partition wall 103 of the case 100 is a flow path for a coolant, and thus butting the cover 200 against the case 100 structurally fails to compress the bead formed in the partition-wall sealing portion 301a of the gasket 301.

In this case, there is a need for compressing the bead of the partition-wall sealing portion 301a of the gasket 301 on the partition wall 103 with the partition-wall sealing portion 302a of the center plate 302 instead of the cover 200. However, the center plate 302, which typically has a low stiffness due to its thin-plate shape, is easily deformed by the reaction force of the bead and fails to sufficiently compress the bead of the partition-wall sealing portion 301a.

Also, as shown in FIG. 8, the flow of the coolant of the water pump having such a casing flows from the upstream chamber 101 to the downstream chamber 102. At this time, the rotation of the impeller 400 results in a positive pressure on the side of the downstream chamber 102, in which the impeller 400 is disposed, and a negative pressure on the side of the upstream chamber 101. When the case 100 and the cover 200 are fastened with bolts, with the laminated gasket 300 being interposed therebetween, the partition-wall sealing portion 302a of the center plate 302 is bended upward by the reaction force of the bead of the partition-wall sealing portion 301a of the gasket 301, and a gap is formed between the partition-wall sealing portions 301a and 302a. Entering a coolant having a positive pressure and radially emitted by the rotation of the impeller 400 into the gap may result in a leak flow path A to the side of the upstream chamber 101.

As a measure for this, it is also possible that the thickness of the center plate 302 be formed thick enough to have such a stiffness that can compress the bead of the partition-wall sealing portion 301a of the gasket 301. However, such a measure is impractical from a viewpoint of cost and weight reduction.

An object of the present invention is to provide a sealing structure for a casing that suppresses the deformation of a center plate on a partition wall and ensures the compression amount of a bead of a gasket on the partition wall, without the center plate being thickened.

Another object of the present invention will become apparent from the following description.

Means for Solving Problem

The above problems will be solved by each of the following items.

1. A sealing structure for a casing, comprising: a case an interior of which is partitioned by a partition wall into an upstream chamber and a downstream chamber, a top of the upstream chamber and a top of the downstream chamber being open; a cover that is attached to a top of the case to form a flow path for a fluid and cause the upstream chamber and the downstream chamber to be communicated inside; and a laminated gasket in which a first gasket disposed on a side of the case, a second gasket disposed on a side of the cover, and a center plate interposed between the first gasket and the second gasket are laminated, and that is provided on butting surfaces between the case and the cover, wherein the first gasket and the second gasket comprise respective beads formed along the butting surfaces, the first gasket and the center plate comprise respective partition-wall sealing portions provided along the partition wall, and the partition-wall sealing portion of the first gasket comprises a bead, and the cover is provided with a contact portion that applies a contact force to the partition-wall sealing portion of the center plate.

2. The sealing structure for a casing according to 1, wherein the contact portion comprises a protrusion that protrudes from an inner bottom surface of the cover toward the partition wall.

3. The sealing structure for a casing according to 1, wherein the contact portion comprises a beam portion provided in the cover along the partition wall so as to oppose an upper end surface of the partition wall, and a flow path hole serving as a flow path for the fluid is formed between the beam portion and the inner bottom surface of the cover.

4. The sealing structure for a casing according to any one of 1 to 3, wherein the second gasket comprises a partition-wall sealing portion along the partition wall.

Effect of the Invention

The present invention provides a sealing structure for a casing that suppresses the deformation of a center plate on a partition wall and ensures the compression amount of a bead of a gasket on the partition wall, without the center plate being thickened.

BRIEF DESCRIPTION OF THE DRAWINGS

FIG. 8 is a diagram illustrating a flow of a coolant in a conventional water pump.

DETAILED DESCRIPTION OF THE INVENTIONS

Embodiments of the present invention will be described below with reference to the drawings.

Figure 1:
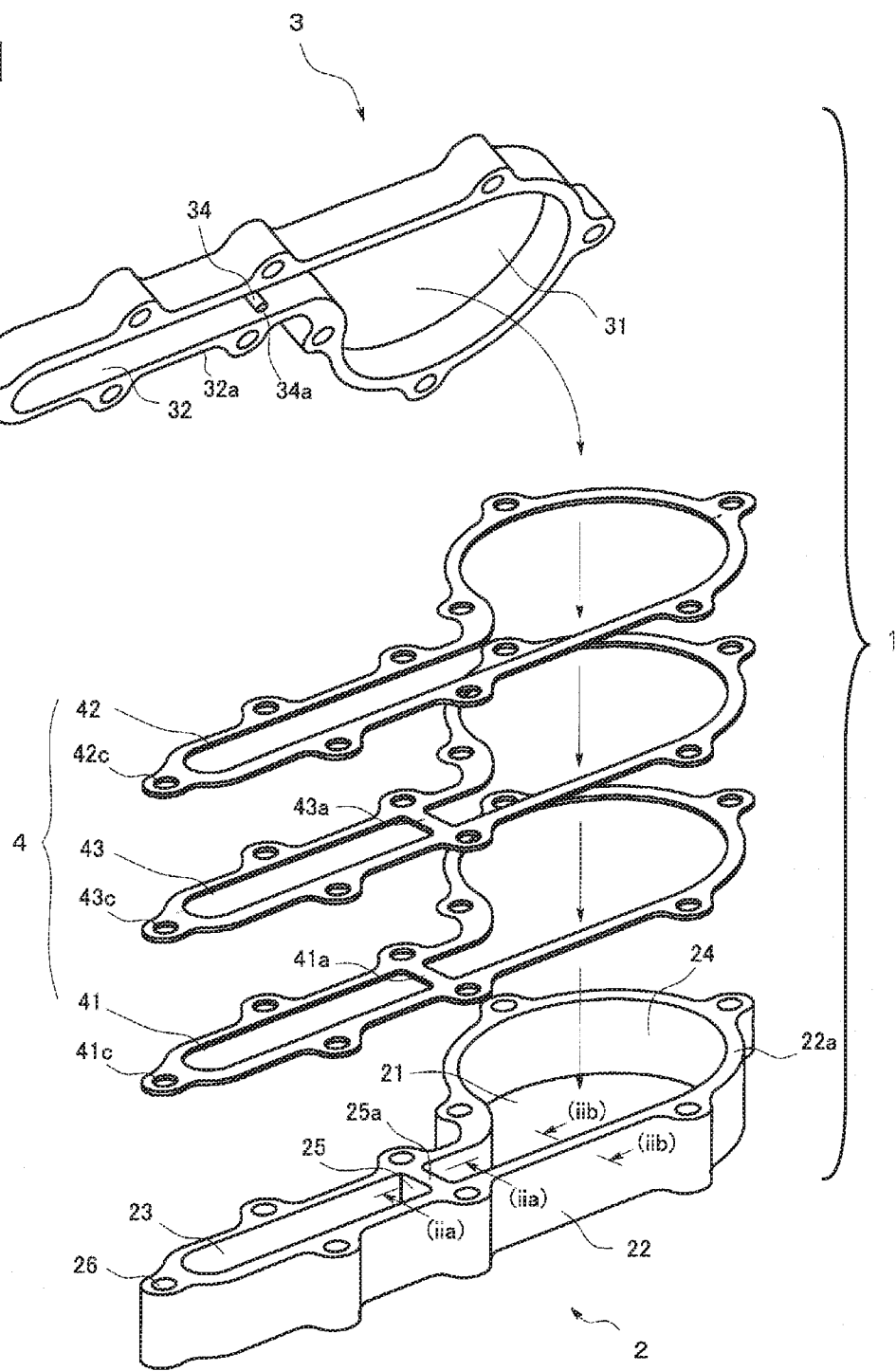
FIG. 1 is an exploded perspective view of an embodiment of a sealing structure for a casing according to the present invention.

FIG. 1 is an exploded perspective view of an embodiment of a sealing structure for a casing according to the present invention. FIG. 2(a) is a sectional view of the casing with a cover, a laminated gasket, and a case being bolt-fastened, taken along line (iia)-(iia) in FIG. 1, and FIG. 2(b) is a sectional view of the casing with the cover, the laminated gasket, and the case being bolt-fastened, taken along line (iib)-(iib) in FIG. 1.

A sealing structure for a casing used for a water pump will be described in the following embodiments. Since the configuration of the water pump is well-known, to clarify the present invention, the components of the water pump are omitted and only parts related to the sealing structure for the casing are illustrated in the drawings.

The casing 1 includes a case 2 and a cover 3. Attaching the cover 3 to the case 2 so as to block its upper opening forms a flow path for a coolant inside. Each of the case 2 and the cover 3 is illustrated as a separate component, but may be a part of an engine or an engine-related component, for example.

The case 2 includes an upstream chamber 23 and a downstream chamber 24 inside a side enclosure 22 erected from the periphery of an inner bottom surface 21. The upstream chamber 23 is in communication with a radiator, and the downstream chamber 24 is in communication with the engine. The upstream chamber 23 includes an inlet (not shown). The inlet causes the coolant to flow in from the radiator. The downstream chamber 24 includes an impeller and an outlet (neither shown). The outlet causes the coolant to flow out to the engine by the rotation of the impeller.

The interior of the case 2 is partitioned into two areas by a partition wall 25, which extends across the opposing sides of the side enclosure 22, to form the upstream chamber 23 and the downstream chamber 24. The upper end surface 25a of the partition wall 25 is formed so as to have the same height as that of the end surface of the side enclosure 22. The end surface of the side enclosure 22 of the case 2 is a butting surface 22a against the cover 3. The upstream chamber 23 and the downstream chamber 24 are open toward the top of case 2 on which the cover 3 is provided.

The impeller (see an impeller 400 in FIG. 8), which is disposed in the downstream chamber 24 but is not illustrated therein, is disposed in such a manner that the tip of the impeller has an approximately same height as that of the upper end surface 25a of the partition wall 25. This prevents a coolant radially emitted by the rotation of the impeller from disturbing the flow of a coolant drawn from the side of the upstream chamber 23.

The cover 3 includes a side enclosure 32. The side enclosure 32 is erected from the periphery of an inner bottom surface 31 so as to match the side enclosure 22 of the case 2. The end surface of this side enclosure 32 is a butting surface 32a against the butting surface 22a of the side enclosure 22 of the case 2. Butting this surface against the butting surface 22a of the side enclosure 22 blocks the upper opening of the case 2 and causes the upstream chamber 23 and the downstream chamber 24 of case 2 partitioned by the partition wall 25 to be communicated through the interior space of the cover 3.

A laminated gasket 4 is disposed between the butting surface 22a of the case 2 and the butting surface 32a of the cover 3. The laminated gasket 4 includes a first gasket 41, a second gasket 42, and a center plate 43, and is formed in a shape that surrounds the interior space of the casing 1 along the butting surface 22a of the case 2 and the butting surface 32a of the cover 3. The center plate 43 is disposed between the first gasket 41 and the second gasket 42.

The first gasket 41 and the second gasket 42 are formed by an elastic body being coated on the surface of a thin metal substrate made of, for example, stainless steel, cold-rolling steel, galvanized steel, and aluminum composite sheet. As such an elastic body, synthetic rubber (including foam rubber) can be used. Examples of such rubber include at least one type of nitrile rubber, styrene-butadiene rubber, fluorine rubber, acrylic rubber, and silicone rubber.

The center plate 43 is formed of a sheet using a metal similar to the above metal substrate.

Partition-wall sealing portions 41a and 43a are respectively formed in the first gasket 41 and the center plate 43 of the laminated gasket 4. The first gasket 41 and the center plate 43 are disposed on the side of the case 2. The partition-wall sealing portion 41a in the first gasket 41 and the partition-wall sealing portion 43a in the center plate 43 are formed so as to bridge, along the partition wall 25 of the case 2, a part that is formed along the butting surface 22a of the case 2 and the butting surface 32a of the cover 3. Thus, when the laminated gasket 4 is disposed between the case 2 and the cover 3, the partition-wall sealing portions 41a and 43a are disposed so as to be piled on the upper end surface 25a of the partition wall 25.

Although not shown in FIG. 1, beads 41b and 42b are respectively formed in the first gasket 41 and the second gasket 42, along the butting surface 22a of the case 2 and the butting surface 32a of the cover 3. The bead 41b of the first gasket 41 is also formed in the partition-wall sealing portion 41a, and is coupled to the bead 41b along the butting surfaces 22a and 32a.

After the butting surface 22a of the case 2 and the butting surface 32a of the cover 3 are butted each other, the case 2 and the cover 3 are fastened with bolts (not shown) that are inserted through bolt holes 26 and 33 as well as bolt holes 41c, 42c, and 43c of the laminated gasket 4. As a result, the beads 41b and 42b sandwiched between the butting surfaces 22a and 32a are compressed, and the laminated gasket 4 seals water-tightly between the case 2 and the cover 3 with the reaction forces of the beads 41b and 42b at this time.

As an example of a contact portion in the present invention, the cover 3 is provided with a protrusion 34. The protrusion 34 is formed so as to protrude from a part in the inner bottom surface 31 of the cover 3 corresponding to the partition wall 25 of the case 2 toward the partition wall 25. The protrusion 34 shown in the present embodiment is formed so as to protrude in a stick shape, but is not limited to any specific shape. Although the protrusion 34 protrudes from the inner bottom surface 31 of the cover 3, a gap is formed against the side enclosure 32 and thus the protrusion 34 does not partition the interior of the cover 3 into two spaces. This ensures a flow path of a coolant between the side enclosure 32 and the periphery of the protrusion 34. This prevents the protrusion 34 from disturbing the flow of the coolant, in the casing 1, from the upstream chamber 23 through the interior of the cover 3 to the downstream chamber 24.

Figure 2:
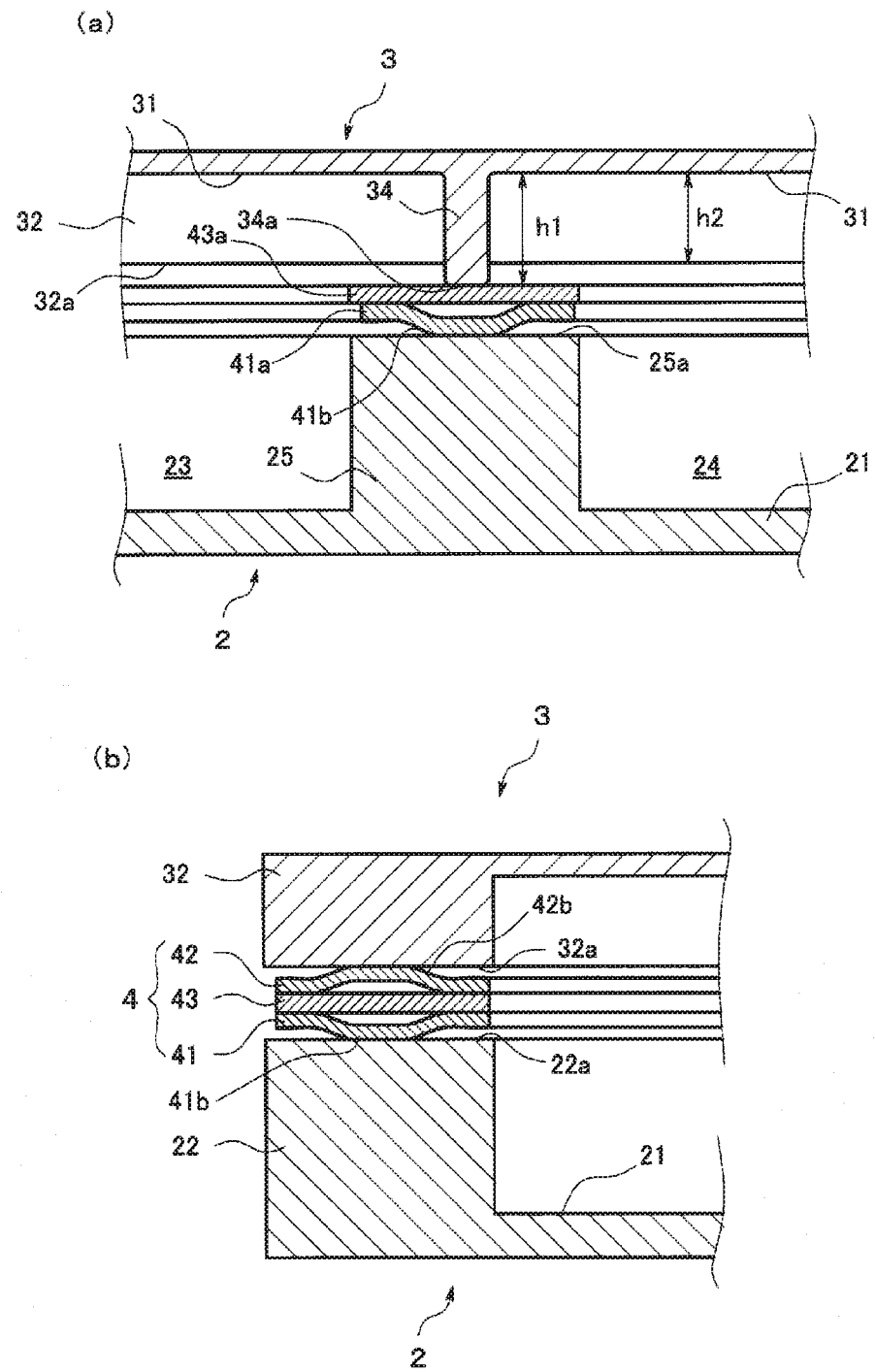
FIG. 2(a) is a sectional view of the casing with a cover, a laminated gasket, and a case being bolt-fastened, taken along line (iia)-(iia) in FIG. 1.
FIG. 2(b) is a sectional view of the casing with the cover, the laminated gasket, and the case being bolt-fastened, taken along line (iib)-(iib) in FIG. 1.

As shown in FIG. 2, the protruding height h1 of the protrusion 34 is formed so as to be higher than the height h2 from the inner bottom surface 31 of the side enclosure 32 of the cover 3. Thus, the tip surface 34a of the protrusion 34 is located at a position protruding from the butting surface 32a of the cover 3 toward the side of the case 2. Specifically, the protruding height h1 of the protrusion 34 is formed so as to have the difference (h1−h2) between the height of the protrusion 34 and the height of the side enclosure 32 that is the same as or slightly larger than the thickness, including the uncompressed bead 42b, of the second gasket 42 of the laminated gasket 4.

As a result, when the case 2 and the cover 3 are fastened with bolts, the tip surface 34a of the protrusion 34 contacts the partition-wall sealing portion 43a of the center plate 43, and with the compression of the beads 41b and 42b of the laminated gasket 4 through the bolt fastening, a contact force is applied so as to contact the partition-wall sealing portion 43a to the partition-wall sealing portion 41a of the first gasket 41 with pressure.

This suppresses the bend and deformation of the partition-wall sealing portion 43a of the center plate 43 caused by the reaction force of the bead 41b at the partition-wall sealing portion 41a of the first gasket 41 and the pressure of the coolant at the time of the circulation, without the center plate 43 being thickened.

Furthermore, a sufficient contact force from the protrusion 34 is also applied to the bead 41b of the partition-wall sealing portion 41a of the first gasket 41 through the partition-wall sealing portion 43a of the center plate 43. As a result, for the bead 41b of the partition-wall sealing portion 41a, a sufficient compression amount similar to the bead 41b of the other part is also ensured against the partition wall 25, and good sealing properties are provided to the upper end surface 25a of the partition wall 25.

The protrusion 34 is disposed in such a manner that its tip surface 34a contacts the longitudinally central portion of the partition-wall sealing portion 43a of the center plate 43. The longitudinally central portion of the partition-wall sealing portion 43a is a part that has the largest deformation amount, so that the bend and deformation of the partition-wall sealing portion 43a is effectively suppressed by contacting this part with the tip surface 34a of the protrusion 34.

Although the present embodiment provides an example in which the cover 3 is provided with the only one protrusion 34, two or more protrusions 34 may be provided depending on the size of the flow path of the coolant in the cover 3 and the length and the width of the partition wall 25.

Figure 3:
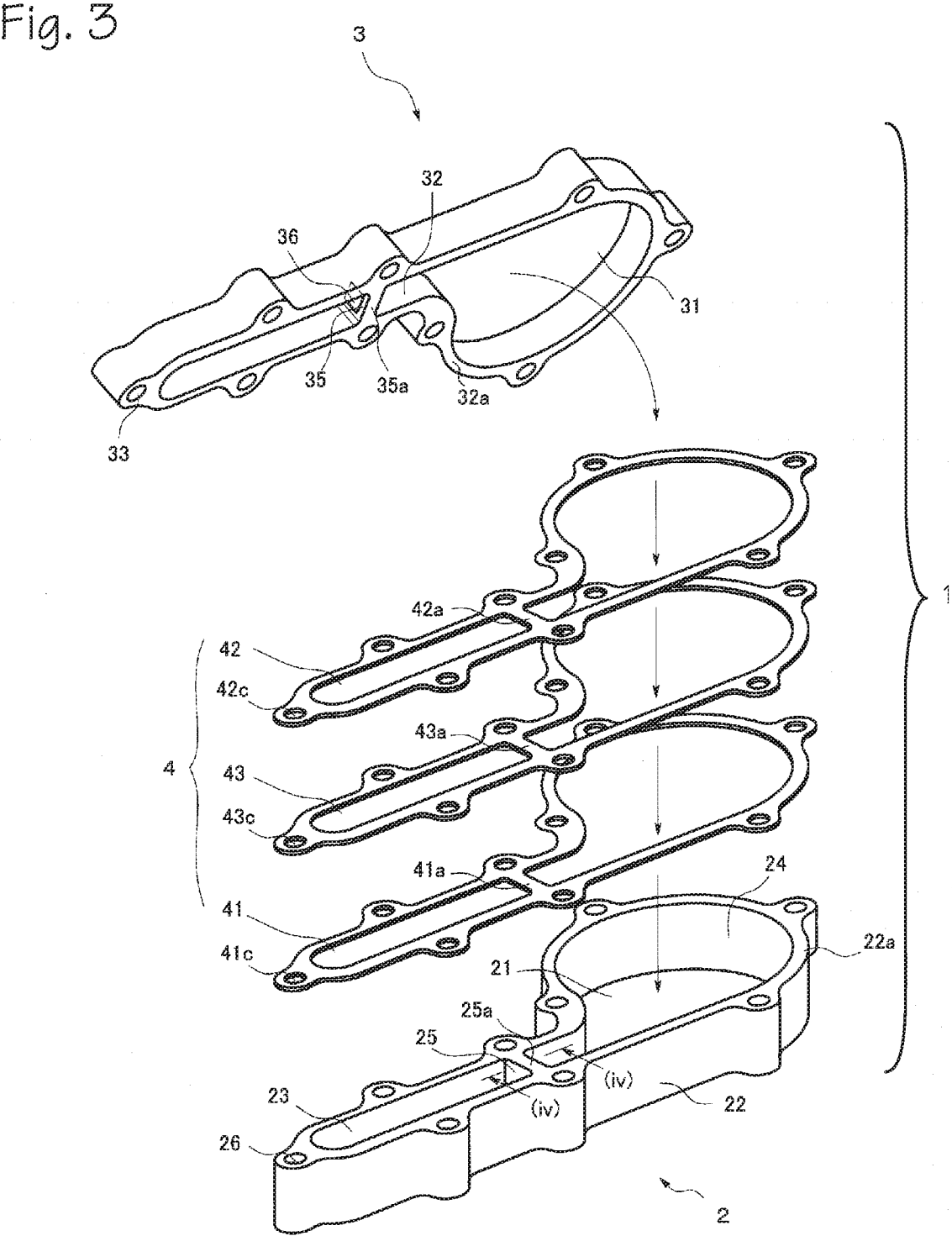
FIG. 3 is an exploded perspective view of another embodiment of the sealing structure for the casing according to the present invention.
Figure 4:
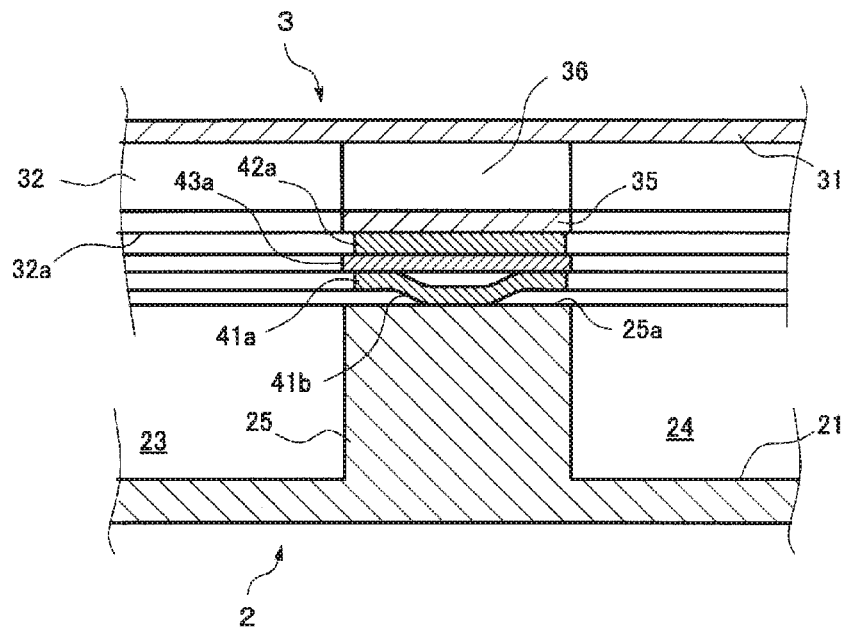
FIG. 4 is a sectional view of the casing with the cover, the laminated gasket, and the case being bolt-fastened, taken along line (iv)-(iv) in FIG. 3.

FIG. 3 is an exploded perspective view of another embodiment the sealing structure for the casing according to the present invention, and FIG. 4 is a sectional view of the casing with the cover, the laminated gasket, and the case being bolt-fastened, taken along line (iv)-(iv) in FIG. 3. Since parts having the same characters as those in FIGS. 1 and 2 indicate parts having the same configurations, the description of FIGS. 1 and 2 is cited for the description thereof and such description is omitted here.

In the present embodiment, the partition-wall sealing portion 42a is also formed in the second gasket 42 of the laminated gasket 4, which is disposed on the side of the cover 3, along the partition wall 25 of the case 2. Although not shown in FIG. 3, beads 41b and 42b are respectively formed in the first gasket 41 and the second gasket 42, throughout its periphery. The bead 41b of the first gasket 41 is also formed in the partition-wall sealing portion 41a. However, the bead is not formed in the partition-wall sealing portion 42a of the second gasket.

As another example of the contact portion in the present invention, the cover 3 is provided with a beam portion 35. The beam portion 35 is formed in a bridge shape along the partition wall 25 so as to oppose the upper end surface 25a of the partition wall 25, across a part that is opposed to and disposed in the interior surface of the side enclosure 32 of the cover 3 in such a manner that the partition wall 25 of the case 2 is sandwiched.

The beam portion 35 does not reach the inner bottom surface 31 of the cover 3, and a flow path hole 36, which is a flow path of a coolant, is formed against the inner bottom surface 31 of the cover 3. This prevents the flow of the coolant from the upstream chamber 23 through the interior of the cover 3 to the downstream chamber 24 from being disturbed, in the casing 1. The interior of the cover 3 bounded by the beam portion 35 is preferably communicated through the flow path hole 36 so that a required amount of the coolant can flow, and the specific shape of the flow path hole 36 is not limited to the shape shown in the present embodiment but any shape may be selected as appropriate.

The end surface 35a of the beam portion 35 is formed so as to have the same height as that of the butting surface 32a of the side enclosure 32 of the cover 3.

As a result, when the case 2 and the cover 3 are fastened with bolts, the partition-wall sealing portions 41a, 42a, and 43a of the laminated gasket 4 are sandwiched between the upper end surface 25a of the partition wall 25 and the end surface 35a of the beam portion 35. With the compression of the beads 41b and 42b of the laminated gasket 4 through the bolt fastening, the end surface 35a of the beam portion 35 gradually approaches the partition-wall sealing portion 42a of the second gasket 42 and comes into contact therewith eventually. This causes a contact force to be applied to the partition-wall sealing portion 43a of the center plate 43 through the partition-wall sealing portion 42a.

This causes the partition-wall sealing portion 43a of the center plate 43 to be pressed from the side of the cover 3 by the end surface 35a of the beam portion 35. Thus, the configuration in which the cover 3 is provided with the beam portion 35 also prevents the partition-wall sealing portion 43a of the center plate 43 from being bent and deformed by the reaction force of the bead 41b at the partition-wall sealing portion 43a of the first gasket 41 and the pressure of the coolant at the time of the circulation, without the center plate 43 being thickened.

The contact force from the beam portion 35 is also applied to the bead 41b of the partition-wall sealing portion 41a of the first gasket 41 through the partition-wall sealing portion 42a of the second gasket 42 and the partition-wall sealing portion 43a of the center plate 43. This ensures the compression amount of the bead 41b of the partition-wall sealing portion 41a and the sealing properties of the upper end surface 25a of the partition wall 25.

Furthermore, the end surface 35a of the beam portion 35 is in surface contact, and thus the contact force is applied over the whole of the partition-wall sealing portion 43a of the center plate 43. This effectively suppresses the bend and deformation of the partition-wall sealing portion 43a.

Figure 5:
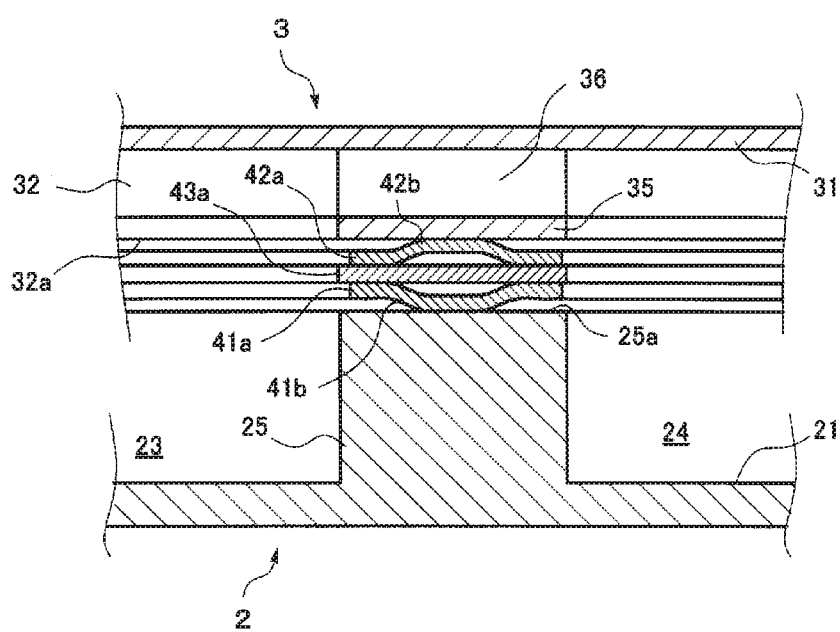
FIG. 5 is a sectional view of the casing with the cover, the laminated gasket, and the case being bolt-fastened illustrating an example in which a bead is formed in a partition-wall sealing portion of a second gasket in FIG. 3, taken along line (iv)-(iv) in FIG. 3.
Figure 6:
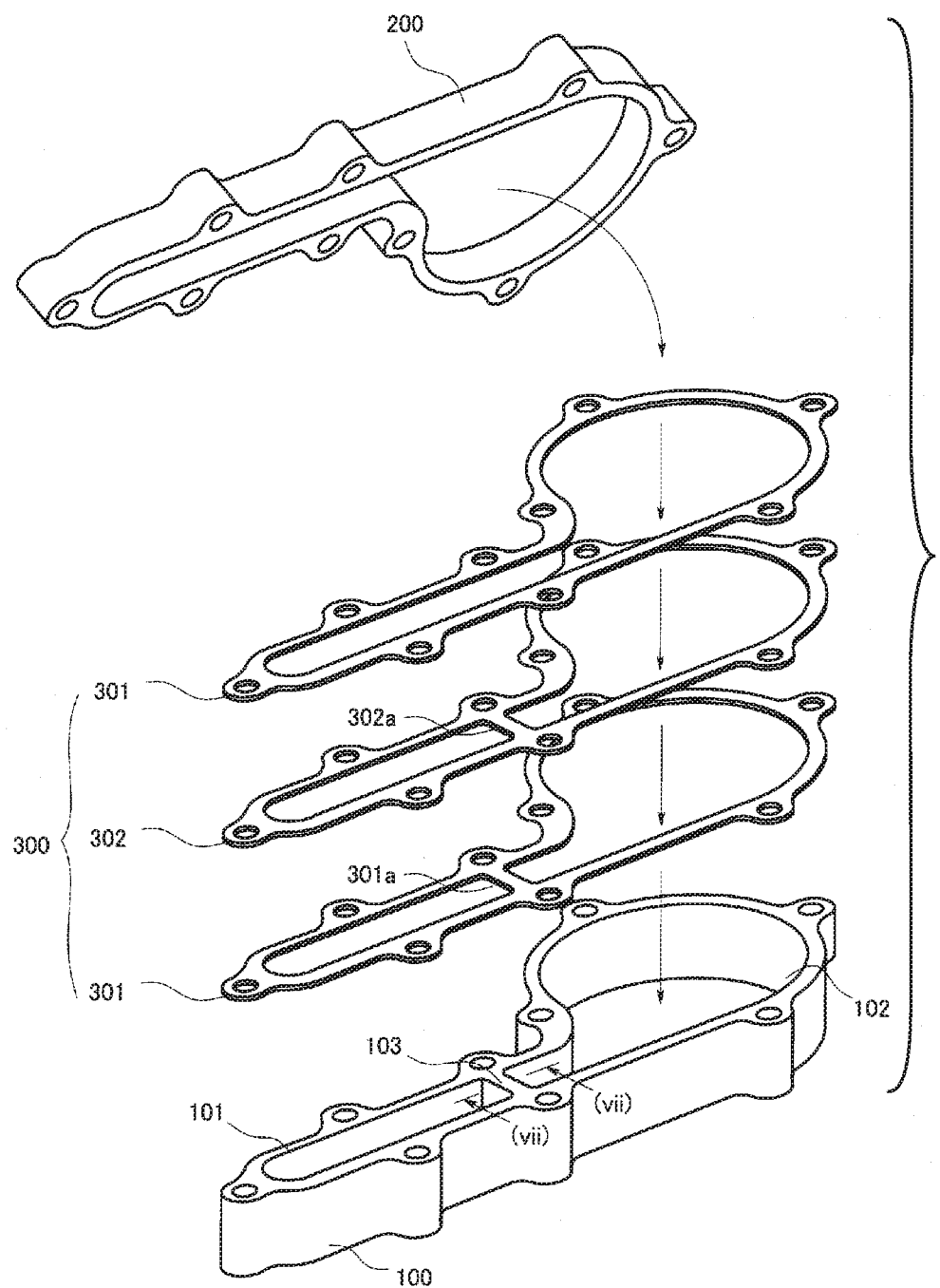
FIG. 6 is an exploded perspective view of a conventional sealing structure.
Figure 7:
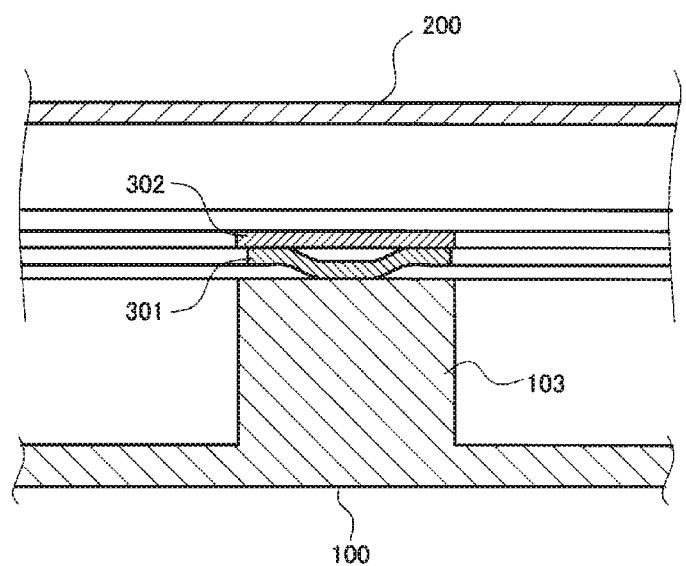
FIG. 7 is a sectional view of the casing with the cover, the laminated gasket, and the case being bolt-fastened, taken along line (vii)-(vii) in FIG. 6.

Although the present embodiment provides an example in which no bead is formed in the partition-wall sealing portion 42a of the second gasket 42, the bead 42b may also be formed in the partition-wall sealing portion 42a as shown in FIG. 5 to compress the bead 41b at the partition-wall sealing portion 41a of the first gasket 41 and the bead 42b at the partition-wall sealing portion 42a of the second gasket 42 so that a greater reaction force can be generated between the beam portion 35 and the partition wall 25. In this case, the beads 41b and 42b is pressed over the whole of the partition-wall sealing portion 43a of the center plate 43 by the beam portion 35, and the suppression effect on the bend and deformation of the partition-wall sealing portion 43a of the center plate 43 and the maintenance effect on the seal performance provided by the reaction forces of the beads 41b and 42b are made the highest.

In the present embodiment, the second gasket 42 may lack the partition-wall sealing portion 42a similar to the second gasket 42 shown in FIGS. 1 and 2. In this case, the end surface 35a of the beam portion 35 may be located at a position protruding from the butting surface 32a of the side enclosure 32 of the cover 3 toward the side of the case 2 similar to the protrusion 34 so that the contact force from the beam portion 35 can be applied to the partition-wall sealing portion 43a of the center plate 43.

Of course, the partition-wall sealing portion 42a similar to the second gasket 42 shown in the present embodiment may also be formed in the second gasket 42 of the laminated gasket 4 shown in FIGS. 1 and 2.

Although the above embodiments have been described about the sealing structure for the casing for water pumps, the sealing structure for the casing according to the present invention is not limited to water pumps.

EXPLANATIONS OF LETTERS OR NUMERALS 1 casing
2 case
   21 inner bottom surface
   22 side enclosure
   22a butting surface
   23 upstream chamber
   24 downstream chamber
   25 partition wall
   25a upper end surface
   26 bolt hole
3 cover
   31 inner bottom surface
   32 side enclosure
   32a butting surface
   33 bolt hole
   34 protrusion (contact portion)
   34a tip surface
   35 beam portion (contact portion)
   35a end surface
   36 flow path hole
4 laminated gasket
   41 first gasket
   41a partition-wall sealing portion
   41b bead
   41c bolt hole
   42 second gasket
   42b bead
   42c bolt hole
   42a partition-wall sealing portion
   43 center plate
   43a partition-wall sealing portion
   43c bolt hole

We claim:
1. A sealing structure for a casing, comprising:
a case an interior of which is partitioned by a partition wall into an upstream chamber and a downstream chamber, a top of the upstream chamber and a top of the downstream chamber being open;
a cover that is attached to a top of the case to form a flow path for a fluid and cause the upstream chamber and the downstream chamber to be communicated inside; and
a laminated gasket in which a first gasket disposed on a side of the case, a second gasket disposed on a side of the cover, and a center plate interposed between the first gasket and the second gasket are laminated, and that is provided on butting surfaces between the case and the cover, wherein
the first gasket and the second gasket comprise respective beads formed along the butting surfaces, the first gasket and the center plate comprise respective partition-wall sealing portions provided along the partition wall, and the partition-wall sealing portion of the first gasket comprises a bead,
the cover is provided with a contact portion that applies a contact force to the partition-wall sealing portion of the center plate,
the contact portion comprises a beam portion provided in the cover along the partition wall so as to oppose an upper end surface of the partition wall, and a flow path hole serving as a flow path for the fluid is formed between the beam portion and the inner bottom surface of the cover.

2. The sealing structure for a casing according to claim 1 wherein the second gasket comprises a partition-wall sealing portion along the partition wall.

* * * * *